July 25, 1967   J. L. MARSH   3,332,432
EXPLOSIVE-OPERATED VALVE
Filed Jan. 14, 1966   3 Sheets-Sheet 1
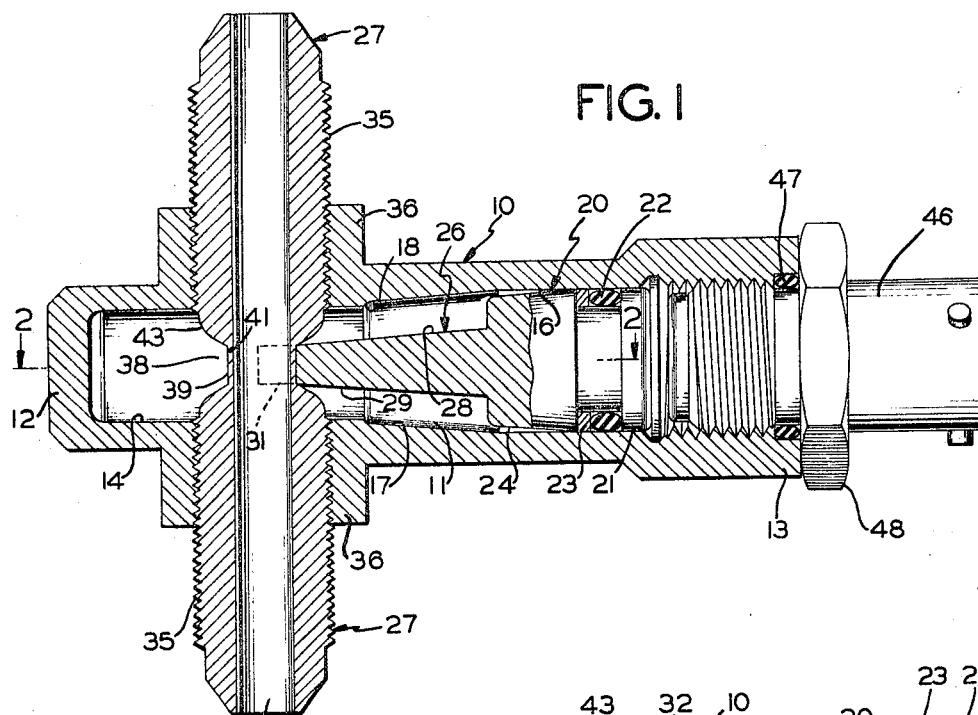
FIG. 1
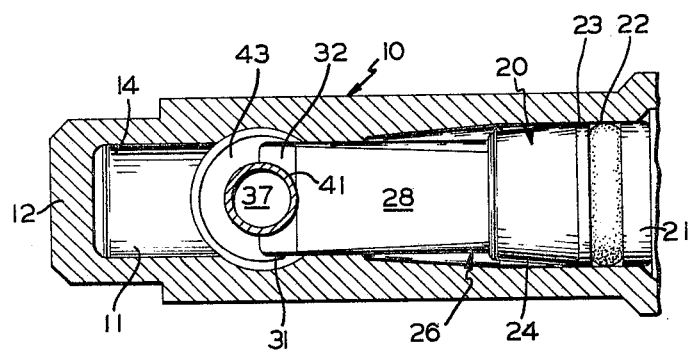
FIG. 2
FIG. 3
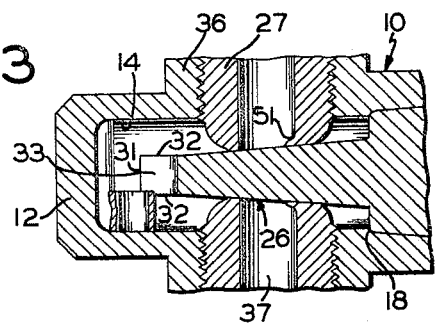
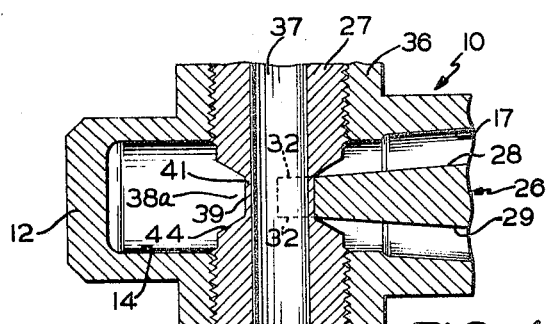
FIG. 4
INVENTOR.
JOHN L. MARSH
BY 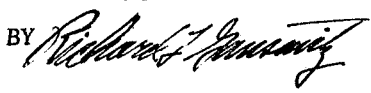
ATTORNEY July 25, 1967  J. L. MARSH  3,332,432
EXPLOSIVE-OPERATED VALVE
Filed Jan. 14, 1966   3 Sheets-Sheet 2
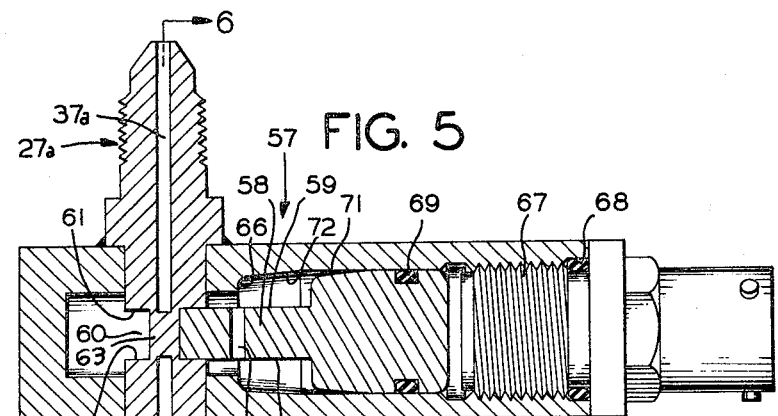
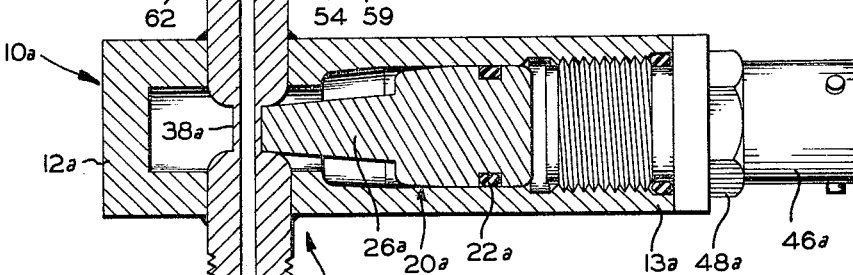
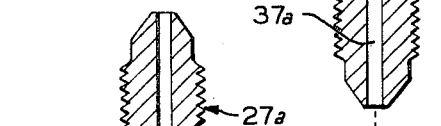
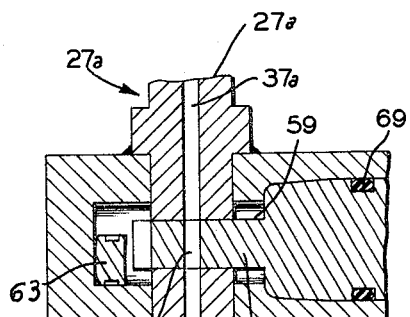
INVENTOR.
JOHN L. MARSH
BY
ATTORNEY

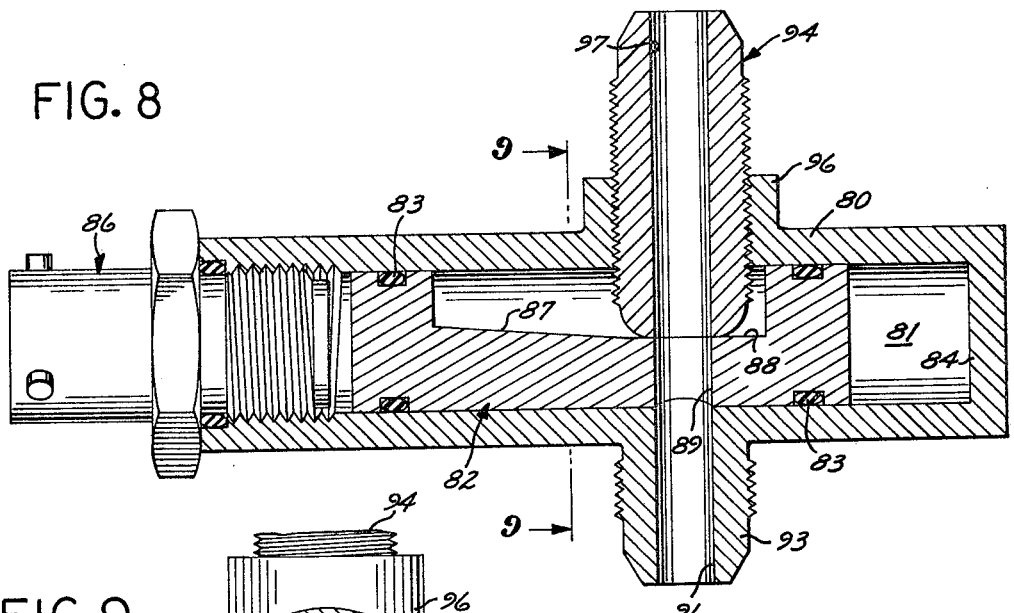

United States Patent Office 3,332,432
Patented July 25, 1967

3,332,432
EXPLOSIVE-OPERATED VALVE
John L. Marsh, Fullerton, Calif., assignor to Pyronetics, Inc., Santa Fe Springs, Calif., a corporation of California
Filed Jan. 14, 1966, Ser. No. 526,940
28 Claims. (Cl. 137—68)

The present application is a continuation-in-part of my co-pending application Ser. No. 227,742, filed Oct. 2, 1962 for Explosive-Operated Valve, and since abandoned.

This invention relates to an explosive-operated valve and valve combination. More particularly, the invention relates to a normally-open explosive-operated valve which functions in a highly superior manner, and which may be readily adapted for normally-closed operation when desired.

A primary object of the present invention is to provide a normally-open explosive-operated valve which creates only a negligible line surge during actuation, and which results upon actuation in an extremely effective seal permitting no flow of liquid or gas through the line.

Another object is to provide an explosive-operated valve in which the valve interior is not exposed to the line fluid prior to valve actuation, so that corrosive gases and liquids may be stored within the valve for long periods of time without creating any corrosive or other deleterious effects whatsoever.

An additional object is to provide a normally-open explosive-operated valve which upon actuation creates two series-arranged metal-to-metal seals capable of blocking fluid flow even at high pressures such as many thousands of pounds per square inch.

A further object is to provide a normally-closed valve which is not sensitive to back pressure, and is adapted to operate with little or no surge in the line.

A further object is to provide an explosive-operated valve and valve combination adapted to contain numerous types of liquids and gases at extremely high pressures.

A further object is to provide a valve assembly which may be readily adapted for either normally-closed or normally-open operation.

Another object is to provide a valve combination of the explosive-operated type, being adapted to effect first starting and then blocking of fluid flow in the line.

Another object is to provide an explosive-operated valve which is readily reusable.

These and other objects and advantages of the invention will be more fully set forth in the following specification and claims, considered in connection with the attached drawings to which they relate.

In the drawings:

FIGURE 1 is a longitudinal central sectional view illustrating a normally-open explosive-operated valve, constructed in accordance with the present invention, in its normal or open condition;

FIGURE 2 is a horizontal sectional view taken generally on line 2—2 of FIGURE 1 but illustrating the ram in plane;

FIGURE 3 is a fragmentary longitudinal central sectional view corresponding to the left-central portion of FIGURE 1, but showing the ram in actuated position;

FIGURE 4 is a fragmentary view corresponding to the left-central portion of FIGURE 1 but illustrating a modification wherein the annular recess in the pipe section has generally conical walls instead of generally hemispherical walls;

FIGURE 5 is a longitudinal central sectional view illustrating a valve combination wherein normally-open and normally-closed valves are connected in series relationship relative to each other, both valves being illustrated in their normal positions;

FIGURE 6 is a transverse sectional view taken on line 6—6 of FIGURE 5, and showing the relationship which occurs subsequent to actuation of both valves;

FIGURE 7 is a fragmentary sectional view illustrating the normally-closed valve component of FIGURE 5 in its actuated or open condition;

FIGURE 8 is a longitudinal central sectional view of a normally-open valve which incorporates certain features of the valves of FIGURES 1–6 and is, additionally, readily reusable;

FIGURE 9 is a transverse sectional view taken on line 9—9 of FIGURE 8; and

FIGURE 10 is a view corresponding to FIGURE 8 except that the ram is shown in elevation and in actuated position blocking flow of fluid through the valve.

Referring first to the embodiment of FIGURES 1–3, the apparatus is illustrated to comprise an elongated valve body 10 defining a valve chamber 11, the body having a closed end 12 and an open end 13. The wall of valve chamber 11 at regions adjacent the closed end 12 is shaped as a relatively small-diameter cylinder 14, whereas the wall portion adjacent open end 13 is shaped as a relatively large-diameter cylinder 16. Cylindrical walls 14 and 16 are coaxial relative to each other and are axially spaced a substantial distance apart, being connected by a frustoconical wall section 17 which is coaxial with both cylindrical walls. The large-diameter end of frustoconical wall section 17 merges with the large-diameter cylindrical wall 16. The small-diameter end of the frustoconical wall section does not merge with small-diameter wall 14, being instead substantially larger in diameter so that a shoulder 18 is formed. Such shoulder serves as a positive stop means.

Mounted in valve chamber 11 for longitudinal sliding movement therein is an elongated ram 20. Such ram has a cylindrical section 21 which is disposed within the large-diameter cylindrical wall 16 and is adapted to slide therealong, being provided in a suitable annular groove with an O-ring 22 and back-up ring 23 adapted to maintain sealing contact with the wall 16. Formed adjacent the cylindrical ram section 21 is a frustoconical section 24 which is coaxial therewith and has a taper corresponding generally to that of the wall section 17. The taper angles of ram section 24 and wall section 17 are related to each other in such manner that a wedging and locking action is achieved therebetween upon longitudinal shifting of the ram until the inner end of section 24 engages positive stop shoulder 18 (FIGURE 3).

The remaining or inner section of the ram 20, numbered 26, is shaped as a shearing and wedging means adapted to shear through and then seal with a pipe or conduit 27 which extends transversely through valve chamber 11. Stated more definitely, the inner ram section 26 is shaped with opposed flat wedge surfaces 28 and 29 which converge in a direction from the frustoconical ram section 24 toward closed end 12 of the valve body. Stated in greater detail, the wedge surfaces 28 and 29 are oblique to a plane (which will hereinafter be termed the "reference plane") which contains the common longitudinal axis of walls 14, 16 and 17 and is perpendicular to the axis of pipe 27. The surfaces 28 and 29 are mirror images of each other on opposite sides of such reference plane. Imaginary extensions of the flat surfaces 28 and 29 intersect each other along a straight line disposed in such reference plane, such straight line being perpendicular to a plane containing such common longitudinal axis and also the axis of pipe 27.

The opposed side edges of the inner ram section 26 are portions of a cylinder having a diameter corresponding generally to that of the small-diameter cylindrical wall 14, and coaxial therewith, so that such wall 14 guides and centers the ram section 26 during longitudinal shifting thereof in the valve chamber.

Formed integrally at the inner end of the wedge section 26 is a shearing section 31 having opposed surfaces 32 which are disposed equal distances on opposite sides of, and are parallel to, the previously-indicated reference plane. The center portion of such shearing section is notched or cut out in semi-circular manner, so that a generally semi-cylindrical end wall 33 (FIGURE 3) is formed and is adapted to fit closely against a relatively thin-walled section of pipe or conduit 27, as will be discussed below.

Pipe or conduit 27 is, throughout most of its length, a relatively thick-walled metal element which is mounted in the valve body 10 perpendicular to the previously-indicated reference plane, the illustrated pipe being externally threaded at 35 for threaded, sealing reception within opposed boss portions 36 of the valve body. The pipe has a central passage 37 the wall of which is cylindrical, and axis of the central passage intersecting the axis of the valve chamber 11 at a point disposed in the reference plane.

An external annular groove 38 is formed in that portion of pipe or conduit 27 which is disposed within the valve chamber 11. Such groove has a cylindrical bottom wall 39 which is concentric with the axis of passage 37 and is disposed relatively adjacent thereto, so that a thin-walled tubular pipe section 41 is created. The length of such thin pipe section 41 is substantially equal to the distance between the planes containing parallel surfaces 32 of shearing section 31. The section 41 may be termed a "shear section" since it is adapted to be sheared out of the pipe.

The side walls of the annular groove 38 are convergent inwardly, that is to say from diametrically-opposed regions of cylindrical wall section 14 toward the thin-walled pipe section 41. The result is that the portions of pipe 27 adjacent opposite ends of thin-walled section 41 are adapted to be somewhat crushed and polished into sealing relationship with wedge surfaces 28 and 29 as will be described hereinafter.

In the embodiment of FIGURES 1–3 the side walls of annular groove 38 are sections 43 of spheres or spheroids, the centers of such spheres or spheroids lying along the axis of pipe passage 37 on opposite sides of the valve chamber 11. In the modification shown in FIGURE 4, the side walls of the annular groove are conical, as shown at 44, the apex of each cone being disposed generally in the above-mentioned reference plane. In both forms, the side walls of the annular groove converge toward each other, that is to say toward the axis of chamber 11.

The valve further comprises an explosive propellant or squib element 46 adapted to generate a sufficient explosive force to propell the rams at high velocity from the normal position shown in FIGURE 1 to the actuated position of FIGURE 3. The indicated squib 46 is threaded into the open end 13 of valve body 10, there being an O-ring seal 47 provided adjacent a nut portion 48 of the squib.

*Operation, and examples of materials and taper angles which may be employed*

In the normal position of the valve, shown in FIGURES 1 and 2, there is straight-through flow of fluid through the pipe passage 37, which has no turbulence-creating discontinuity or configuration of any sort. The fluid contained within the passage 37 may be highly corrosive without producing any effect whatsoever upon the valve elements, there being a toal absence of fluid (other than air) in the valve chamber 11. Furthermore, since there is nothing but air in the valve chamber, the ram element 20 is not forced to overcome any back pressure when it is shifted from its normal position to the actuated position shown in FIGURE 3.

Upon detonation of squib 46, ram 20 is shifted at extremely high velocity from the position shown in FIGURES 1 and 2 to that shown in FIGURE 3. During the initial portion of such shifting, the shearing section 31 shears out the thin-walled pipe section 41 prior to commencement of any substantial wedging action. After the thin-walled pipe section 41 is thus sheared out, which severs the pipe into two components, the upper and lower wedge surfaces 28 and 29 effect both crushing and smoothing or polishing of the relatively thin-walled and tapered pipe regions adjacent the regions of shear. Stated otherwise, those regions of the severed pipe components which are adjacent the smaller-diameter ends of surfaces 43, FIGURE 1, and 44, FIGURE 4, are crushed and also polished by the wedge surfaces 28 and 29 to create areas which are in close sealing contact. Lips 51 are formed, as shown in FIGURE 3, adjacent the portions of the taper surfaces which are spaced relatively far apart, such lips enhancing the sealing action.

Because of the described crushing and polishing relationship, and other important factors including the high-velocity of ram travel, the wedge surfaces 28 and 29 and the adjacent severed sections of pipe or conduit 27 are in such intimate contact that even gas under thousands of pounds per square inch pressure will not leak through the passage 37 from one side of the ram to the other. It is to be understood that in order to leak through the pipe, gas must first flow through one sealing area from the upstream section of the pipe into the valve chamber, and then must flow through the remaining sealing area into the downstream section of pipe. Thus, two effective sealing areas are disposed in series relationship relative to flow of liquid or gas through the passage 37.

It is emphasized that the ram, although it moves at very high velocity, creates little or no line surge in the passage 37. This is because the space which is occupied by the wedge 26 in passage 37 (FIGURE 3) is compensated for by removal from such passage of fluid contained in the thin-walled pipe section 41. Stated otherwise, the ram subtracts from the passage 37 an amount of fluid which is substantially equal to the space occupied by the ram in the passage, so that there is no line surge except that which occurs due to the taper of the ram, which surge is negligible.

It is further emphasized that the wedging relationship which occurs between the ram and the adjacent severed portions of pipe 27 locks the ram in the illustrated actuated position (FIGURE 3). Such wedging relationship present at the pipe cooperates with the previously-indicated wedging relationship which occurs between frustoconical wall 17 and section 24, thereby locking the ram very firmly in actuated position.

The taper angles between the wedge or taper surfaces 28 and 29 must be sufficiently large to create the described crushing and sealing action relative to adjacent portions of the pipe sections, and without requiring an excessively-long ram stroke, but not so large as to create excessively unequal stresses at diametrically-opposite sides of passage 37. Furthermore, the taper angles should not be so large that there is no substantial locking action between the severed pipe sections and the ram. As examples of satisfactory taper angles, the angle between each of the surfaces 28 and 29 and the above-specified reference plane may be about four degrees. It has been found that sealing is achieved although only one of the surfaces is inclined relative to the reference plane, the other surface being parallel to such plane. Thus, surface 28 may be inclined at a four-degree angle relative to the reference plane whereas surface 29 may be parallel thereto. It is emphasized that these are merely examples, and are not to be construed as limitations except as to the general order of magnitude of the taper required.

The metal of which the ram is formed should be substantially harder than that of which pipe 27 is formed, the pipe being more ductile than the ram. This is because it is desired that the pipe fail in compression subsequent to shearing of the thin-walled section 41 therefrom. However, some gouging or scoring of the ram surfaces 28 and 29 is permissible. As examples of materials which have proved satisfactory, the ram 20 may be formed of 17-7 precipitation-hardening stainless steel. The pipe 27 may be formed of No. 321 stainless steel.

The failure or crushing of the relatively ductile pipe, to create the stated intimate sealing contact, may be referred to as permanent plastic deformation.

Embodiment of FIGURES 5-7

Referring next to FIGURES 5-7, the illustrated normally-open valve 56 may correspond to that described relative to the previous embodiment except for minor variations, one of which is that the pipe or conduit 27a is welded to the valve body 10a instead of being threadedly associated therewith. Furthermore, in the illustrated embodiment the boss portions 36 are eliminated. Parts of valve 56 which correspond to the previous embodiment have, in many instances, been given the same reference numeral except followed by the letter "a."

FIGURE 5 additionally illustrates, on the same pipe or conduit 27a and in series relationship relative to the normally-open valve 56, a normally-closed valve 57. In the valve 57, the inner portion 58 of the ram is not tapered but instead is provided with upper and lower surfaces 59 which are parallel to the central reference plane containing the axis of the valve chamber. Furthermore, the annular groove 60 is provided with radial side walls 61 and 62 which are parallel to the reference plane, being spaced apart a distance corresponding generally to the distance between surfaces 59. Such surfaces are adapted to guide the ram and prevent rotation thereof as it shifts from its normal position to its actuated position.

In the normally-closed valve 57, a section of the pipe or conduit 27a, numbered 63, is not drilled out but is instead solid. Such solid section 63 preferably extends substantially the entire distance between the radial walls 61 and 62 of the annular groove. The extreme inner end of the ram is shaped with a semi-cylindrical notch or recess which receives one-half of the solid section 63, the same as is shown in FIGURES 2 and 3 relative to recess wall 33 and thin section 41.

In the operation of the embodiment of FIGURES 5-7, there is no initial flow through the passage 37a due to the presence of the solid section 63, such section being completely impervious to flow of gas or liquid. Upon actuation of the squib 67 which is associated with the normally-closed valve 57, the ram thereof is shifted to the actuated position shown in FIGURE 7. This causes the pipe section 63 to be sheared out from between radial surfaces 61 and 62. Flow through the passage 37a then commences as soon as a port 54 in the ram 58 comes into registry with the passage 37a. Such port is cylindrical in shape, and is adapted to register with the passage 37a when the tapered portion of the ram seats on the positive stop shoulder 66 therefor. It is to be understood that the normally-closed valve 57 incorporates the squib 67, sealing rings 68 and 69, and tapered portions 71 and 72, the latter being shaped to lock the ram in the actuated position of FIGURE 7.

After flow through passage 37a is initiated in response to actuation of the normally-closed valve 57, it may be blocked due to operation of the normally-open valve 56. Thus, a start-stop operation is achieved in a relatively compact space and with a minimum of mechanism. The flow through the valve is at all times straight-through and free of turbulence.

It is pointed out that the pipe region at each end of each section 41 or 63 may be termed a stress riser or shear point. This would be true even if section 41, for example, were thick walled but had spaced annular saw cuts therein to form the stress risers.

It is emphasized that the present valve construction permits the same valve bodies, squibs, and other standard components to be used interchangeably between normally-open and normally-closed valves. In fact, the valves may be identical to each other except for the ram, since it is possible to employ a pipe section in the valve 57 which is identical to that shown in valve 56, except that the section in valve 57 is not drilled out in regions adjacent the ram.

A further advantage of the present valve is ease of assembly, it being merely necessary to mount the pipe, insert the ram, and then screw in the squib. Such operation is more simple than in valves wherein a nipple is employed instead of a continuous pipe section.

Embodiment of FIGURES 8-10

FIGURES 8-10 illustrate a readily and cheaply reusable normally-open valve, but one which is characterized by important disadvantages in comparison to the normally-open valves discussed above. Thus, for example, the seals of the valve of FIGURES 8-10 are at all times subject to the corrosive effects of the fluid, whereas in the above-described valves the fluid is contained within the pipe or conduit (passage) until valve actuation occurs.

The valve of FIGURES 8-10 is illustrated to comprise an elongated cylindrical housing 80 defining a cylindrical valve chamber 81. A cylindrical ram 82 is mounted slidably in chamber 81 and has sealing rings 83 at opposite ends thereof.

The inner ram end is spaced (FIGURE 8) from a closed end 84 of housing 80, such closed end serving as a stop. The other ram end is open for sealing reception of an explosive squib 86, as described relative to the previous embodiments.

A section of ram 82 is cut out, between seals 83, to form a recess having an inclined planar wall portion 87 which may correspond to the previously-described wedge surface 28. An adjacent planar wall portion 88 of the recess is shown as being parallel to the axis of chamber 81. Formed through the ram, at and perpendicular to the surface portion 88, is a cylindrical port or bore 89.

Ram 82 is, when in the initial position of FIGURE 8, so positioned that bore 89 registers with a corresponding radial bore 91 in housing 80. Such bore or flow passage 91 is shown as provided in an integral threaded boss 93 on the housing. It is to be understood, however, that element 93 may also be a removable nipple.

A removable nipple 94 is threaded inwardly through a boss 96 which is disposed diametrically opposite boss 93. Nipple 94 preferably abuts surface 88 in order that a substantially continuous flow passage will be formed by passages 91 and 89, and by the passage 97 through nipple 94.

Nipple 94 is formed of a relatively ductile and deformable metal, as described above relative to pipe 27, for example. The inner end of nipple 94 is tapered or beveled, as described in detail relative to elements 43, for example. Surfaces 87 and 88 (particularly the latter) should be much harder than the metal forming nipple 94.

The surfaces or walls of the recess in ram 82 are so shaped that the net axial force created by the fluid present in the recess (between seals 83) will be zero. Thus, the movable element is balanced and will remain stationary until propelled by squib 86. Undesired axial and rotational ram movement is prevented by nipple 94 when the same is threaded into forcible contact with surface 88.

To close the valve, it is merely necessary to fire the squib 86 and thus explosively propel ram 82 to the right until wall 84 is engaged as shown in FIGURE 10. Taper or wedge surface 87 then effects the previously-described deformation (or crushing) of the inner end of nipple 94, blocking fluid flow through the valve.

The valve may be reused be merely replacing the nipple 94 and the squib 86, it being possible to employ ram 82 for a number of firings.

Various embodiments of the present invention, in addition to what has been illustrated and described in detail, may be employed without departing from the scope of the accompanying claims.

I claim:

1. An explosive-operated valve, which comprises wall means to define a valve chamber, a pipe element sealingly mounted in said wall means and extending through said chamber, said pipe element having stress risers therein at longitudinally spaced points within said chamber whereby to form between said stress risers a pipe section adapted to be sheared out, a ram element mounted for movement in said chamber relative to said pipe element and having a shearing section adapted upon movement of said ram element to shear out said section, and explosive means to move said ram element and effect said shearing out of said section between said stress risers whereby to provide a control operation relative to flow of fluid through said pipe element.

2. The invention as claimed in claim 1, in which said pipe element has a continuous passage therethrough prior to movement of said ram element, and in which said ram element is adapted subsequent to said shearing of said section to block flow of fluid through said continuous passage.

3. The invention as claimed in claim 1, in which said section of said pipe element is formed with a bulkhead or partition therein preventing flow of fluid through said pipe element, and in which means are provided to establish flow through said pipe element subsequent to the shearing of said section from said pipe element.

4. A normally-open explosive-operated valve, which comprises a valve body having a valve chamber therein, an elongated pipe mounted transversely of said valve body and extending through said chamber, said pipe having a continuous passage therethrough, said pipe having within said chamber a section the wall thickness of which is reduced in comparison to the wall thickness of adjacent portions of said pipe, combination shearing and wedge means movably mounted in said valve chamber for engagement with said section of reduced wall thickness, said shearing and wedge means being so related to said section that shifting of said shearing and wedge means in said chamber will first effect severing of said pipe and then effect sealing engagement between said shearing and wedge means and at least one portion of said pipe adjacent thereto to thus arrest flow through said pipe, and explosive means to effect said shifting of said combination shearing and wedge means whereby to arrest flow of fluid through said pipe.

5. Apparatus for effecting blocking of fluid flow through a pipe, which comprises means to fixedly support a pipe at spaced points therealong, combination shearing and wedge means to sever said pipe at a location between said spaced points and thereafter wedge between adjacent severed portions of said pipe to form seals therewith and thus arrest flow through said pipe, and explosive means to effect high-velocity shifting of said shearing and wedge means to effect said severing and wedging operations.

6. A normally-open explosive-operated valve, comprising an elonagted valve body having an elongated chamber therein, a metal pipe mounted sealingly and fixedly to said valve body at opposite sides of said chamber and extending therethrough, said pipe having a continuous passage therethrough, said pipe having within said chamber an external annular groove shaped to reduce the wall-thickness of said pipe and permit shearing out of a relatively thin-walled section thereof, an elongated metal ram element mounted longitudinally in said chamber for shifting longitudinally thereof, said ram element having a shearing portion disposed in said groove and adapted to shear out said thin-walled section of said pipe upon initial longitudinal shifting of said ram, said ram also having a wedge portion adapted upon further longitudinal shifting of said ram to wedge between the severed sections of said pipe and form seals therewith preventing flow of fluid through said pipe, said explosive means to effect high-velocity longitudinal shifting of said ram element in said chamber to result in said shearing and wedging functions.

7. The invention as claimed in claim 6, in which the side walls of said annular groove are convergent toward each other whereby to form adjacent said ram relatively thin sections adapted to be crushed and polished upon shifting of said ram to provide effective seals therewith.

8. The invention as claimed in claim 6, in which said pipe is formed of a relatively ductile metal and said ram is formed of a relatively hard metal.

9. The invention as claimed in claim 6, in which said wedge portion is shaped with opposed flat wedge surfaces, the angle between said wedge surfaces being relatively small.

10. A normally-open explosive-operated valve, comprising an elongated valve body having an elongated chamber therein, a metal pipe mounted sealingly in said valve body transversely of said chamber, said pipe having a continuous passage therethrough, said pipe having within said chamber a thin-walled stress riser adjacent a thick-walled section, an elongated ram element mounted in said chamber for shifting longitudinally thereof, said ram element having a shearing portion adapted to sever said pipe at said stress riser upon longitudinal shifting of said ram element, said ram element also having a taper portion adapted upon further longitudinal shifting of said ram element to plastically deform and polish the severed end of said thick-walled section and form a seal therewith preventing flow of fluid through said pipe, and explosive means to effect high-velocity longitudinal shifting of said ram element in said chamber.

11. An explosive-operated valve, comprising an elongated metal valve body having a closed end and an open end, the valve chamber within said body being defined adjacent said closed end by a small-diameter cylindrical wall and adjacent said open end by a large-diameter cylindrical wall, said small and large-diameter cylindrical walls being coaxial of each other and being spaced apart, the portion of said valve chamber between said cylindrical walls being defined by a frustoconical wall, the narrow end of said frustoconical wall meeting said small-diameter cylindrical wall at a stop shoulder, an elongated ram having a cylindrical portion mounted radially-inwardly of said large-diameter cylindrical wall, said ram also having a frustoconical portion adjacent said cylindrical portion, said frustoconical portion being so related to said frustoconical chamber wall as to lock therewith upon forceful engagement of said frustoconical portion with said stop shoulder, said ram also having a metal shearing portion projecting axially from said frustoconical portion into the portion of said chamber defined by said small-diameter cylindrical wall, the end of said shearing portion remote from said frustoconical portion being provided with a semi-circular recess or notch, a continuous metal pipe fixedly mounted perpendicular to said valve chamber and extending therethrough, said pipe having an annular groove therein at the center of said valve chamber, the annularly-grooved portion of said pipe being seated in said semi-circular recess or notch in said shearing portion of said ram, and an explosive squib element mounted in the open end of said valve body to propel said ram toward said closed end and thereby shear out said annularly-grooved portion of said pipe to provide a control operation relative to flow of fluid through said pipe.

12. The invention as claimed in claim 11, in which the side walls of said annular groove converge toward each other, in which said pipe is provided with a continuous passage having a cylindrical wall, and in which said shearing portion of said ram is generally wedge shaped to create a wedging action relative to the severed portions of said pipe when said annularly-grooved section thereof is sheared out whereby to block flow of fluid through said pipe.

13. The invention as claimed in claim 11, in which said annularly-grooved section of said pipe is formed with an integral bulkhead or partition whereby to normally block flow of fluid through said pipe, in which said shearing portion of said ram is formed with opposed relatively flat and generally parallel surfaces which are perpendicular to the axis of said pipe, in which the side walls of said annular groove are generally radial and parallel to said flat surfaces of said shearing portion, and in which said shearing portion is provided with a cylindrical port therethrough disposed to register with the passage through said pipe when said frustoconical portion of said ram is seated against said stop shoulder, whereby to effect commencement of fluid flow through said pipe and said port upon longitudinal shifting of said ram to shear out said annularly-grooved section of said pipe.

14. A normally-closed explosive-operated valve, comprising a valve body having a valve chamber therein, a continuous integral pipe mounted sealingly in and transversely of said valve body and extending through said chamber, said pipe having an integral bulkhead or partition therein disposed in said chamber, portions of said pipe on opposite sides of said integral bulkhead or partition having small wall thickness whereby to form stress risers facilitating shearing out of the portion of said pipe containing said bulkhead or partition, a ram movably mounted in said chamber and having a shearing section adapted in response to a predetermined shifting of said ram to engage and shear out said portion of said pipe containing said bulkhead or partition, and explosive means to effect said predetermined shifting of said ram in said chamber to thus effect shearing out of said pipe portion for establishment of fluid flow through the valve.

15. An explosive-operated valve, comprising a valve body having a valve chamber therein, a ram movably mounted in said chamber, cooperating taper surface means on said valve body and on said ram to lock said ram in said body in response to longitudinal shifting of said ram, a pipe extending through said valve body transversely of said chamber, means on said ram to shear through and thus sever a section of said pipe, taper means on said ram to lock between the severed portions of said pipe to arrest flow through said pipe and to cooperate with said taper surface means in locking said ram therein, and explosive means to shift said ram in said body.

16. A start-stop valve combination, comprising an elongated pipe having two longitudinally spaced stress-riser sections, one of said sections having a bulkhead or partition therein to block flow of fluid through the pipe, first explosive-operated means to shear out said section having said bulkhead or partition therein and to initiate flow of fluid through the pipe, and second explosive-operated means to shear through the remaining stress-riser section and to block flow of fluid through the pipe.

17. A shut-off valve apparatus, which comprises a pipe section having a continuous flow passage therethrough, said pipe section having formed therein a shear portion adapted to be sheared out of said pipe section to divide the same into first and second components on opposite sides of said shear portion, a valve body defining a sealed chamber in which are disposed said shear portion and the ends of said components immediately adjacent said shear portion, means to effect support of said component ends independently of said shear portion, a shear and wedge element adapted in response to shifting thereof transversely between said component ends to first effect shearing out of said shear portion and then effect deforming engagement with said component ends for sealing contact therewith, said component ends being adapted to be permanently plastically deformed by said shear and wedge element into close sealing engagement therewith to arrest flow of fluid through the pipe in response to said shifting of said shear and wedge element, and means to shift said shear and wedge element rapidly between a normal position out of shearing contact with said shear portion and an actuated position in wedging and sealing relationship between said component ends.

18. A shut-off valve means, which comprises a metal pipe having a flow passage therethrough, said pipe having a shear section adapted to be sheared to thereby sever said pipe, an end region of said pipe immediately adjacent said shear section being adapted to be deformed to provide a seal, means to support said end region of said pipe, said means being independent of the portion of said pipe on the opposite side of said shear section from said end region, a metal shearing and deforming element adapted when shifted transversely of said pipe against said shear section to first sever said pipe and then effect deforming contact with said end region for sealing therewith to block fluid flow therethrough, guide means to guide said shearing and deforming element along a path transverse to said pipe and intersecting said shear sections, said guide means and said shearing and deforming element being so constructed and related that shifting of said shearing and deforming element along said path effects permanent plastic deformation of said end region whereby an effective seal is achieved, and means to shift said shearing and deforming element along said path between a normal position out of shearing engagement with said pipe and a predetermined actuated flow-blocking position in crushing and sealing engagement with said end region, the portion of said shearing and deforming element which is in engagement with said end region when said shearing and deforming element is in said predetermined actuated position being impervious to fluid.

19. A start-stop valve combination, which comprises an elongated pipe having first and second shear sections at spaced points therealong, said first shear section having a bulkhead or partition therein to block flow of fluid through the pipe, said second shear section being open, the remainder of said pipe being open whereby fluid may flow through said pipe upon removal of said bulkhead or partition, first and second valve body portions provided sealingly around said pipe at said respective shear sections whereby said first shear section is contained in said first valve body portion and said second shear section is contained in said second valve body portion, first and second rams disposed, respectively, in said first and second valve body portions for shifting transversely of said pipe, said first ram having a shear portion adapted to shear out said first shear section of said pipe, said first ram also having a passage therethrough adapted to register with the flow passage in said pipe subsequent to shearing out of said first shear section, said second ram having a shear portion adapted to shear out said second shear section, said second ram having wedge surfaces formed thereon to wedge between portions of said pipe on opposite sides of said second shear section and thereby provide a seal preventing flow of fluid through said pipe, and first and second explosive squib means disposed, respectively, in said first and second valve body portions to actuate said first and second rams, whereby operation of said first squib means propels said first ram to start flow of fluid through said pipe, and operation of said second squib means propels said second ram to stop flow of fluid through said pipe.

20. An explosive-operated valve, which comprises wall means to define a flow passage for a fluid, a portion of said wall means being relatively thin and forming a stress riser for reception of a shearing element, a shearing element disposed generally transverse to said flow passage, said shearing element having a portion sufficiently large to block said flow passage, and explosive-operated means to explosively shift said shearing element along a path transverse to said flow passage, said path being so located that said shearing element engages and shears through said thin stress riser into blocking relationship relative to the fluid in said flow passage, said portion of said shearing element being in engagement with sheared surface regions of at least part of said wall means after said explosive shifting of said shearing element.

21. The invention as claimed in claim 20, in which at least the region of said wall means adjacent said stress riser is formed of a metal which is relatively ductile, in which said shearing element is an imperforate wedge-shaped blade disposed in a plane transverse to said flow passage, said blade being formed of a metal substantially harder than said ductile metal, said blade being shaped to completely block said flow passage after explosive shifting of said blade through said stress riser, and in which said blade and stress riser are so related to each other that said blade when shifted along said path will wedge forcibly against and plastically and sealingly deform severed regions of said stress riser to thus prevent substantial leakage of fluid from said flow passage.

22. An explosive-operated valve, which comprises wall means to define elongated flow-passage means, annular portions of said wall means at points spaced longitudinally of said flow-passage means being thin in comparison to portions of said wall means immediately adjacent said thin portions, said annular portions being coaxial with said flow-passage means, whereby annular stress risers are formed at said longitudinally spaced points, and explosive means to shear out of said wall means and thus remove bodily from said flow-passage means the region of said wall means between said stress risers, thereby effecting a flow-controlling operation relative to fluid present in said flow-passage means.

23. The invention as claimed in claim 22, in which said explosive means comprises an explosively-propelled wedge-shaped blade adapted to wedge against and sealingly deform, by permanent plastic deformation, an annular region of said wall means immediately adjacent at least one of said stress risers, said annular region being on the opposite side of said one stress riser from the other stress riser, said annular region being formed of a metal substantially softer and more ductile than the metal forming said blade.

24. The invention as claimed in claim 22, in which said annular region is disposed in a valve chamber defined by a valve housing, said annular region being fixedly supported by one wall of said chamber and being inwardly protuberant therefrom, the wall thickness of at least part of said annular region diminishing in a direction from said one wall toward said stress riser.

25. A normally-open valve, which comprises a valve housing defining a valve chamber, a conduit element having a portion extending into said valve chamber from at least one wall of said housing, said conduit element having a flow passage therethrough, a ram mounted movably in said valve chamber in a direction transverse to the axis of said conduit element, said ram having an imperorate, relatively hard, inclined surface portion disposed transverse to said conduit element and adapted in response to shifting of said ram in said direction to wedge against a relatively ductile portion of said conduit element and effect permanent plastic deformation of said relatively ductile portion into intimate, effective sealing relationship with said imperforate surface portion to thus block flow of fluid through said conduit element, explosive means to forcibly shift said ram in said direction, and means to effect fluid flow through said conduit element prior to said shifting of said ram.

26. The invention as claimed in claim 25, in which said conduit element comprises a nipple formed of ductile metal, said nipple being removably mounted in said valve housing, said imperforate surface portion being formed of metal substantially harder than that forming said nipple.

27. The invention as claimed in claim 26, in which said nipple has an end registered with a port in said ram prior to said shifting of said ram in said direction, said port then being registered with a second flow passage through said housing, said port and second flow passage forming said means to effect fluid flow prior to said shifting of said ram.

28. The invention as claimed in claim 27, in which said ram has balanced end portions disposed on opposite sides of said nipple end, in which sealing means are provided between said end portions and the interior surface of said housing, and in which said means to shift said ram is an explosive squib.

References Cited

UNITED STATES PATENTS

| | | | |
|---|---|---|---|
| 1,874,405 | 8/1932 | Wood | 251—328 |
| 2,365,364 | 12/1944 | Temple | 137—68 |
| 2,441,894 | 5/1948 | Mennecier | 137—68 X |
| 2,919,111 | 12/1959 | Nicolson | 166—.5 |
| 2,937,654 | 5/1960 | Wilner | 137—68 |
| 2,997,051 | 8/1961 | Williams | 137—68 |
| 3,013,571 | 12/1961 | Fulton | 137—68 |
| 3,093,151 | 6/1963 | Merkowitz | 137—68 |
| 3,125,108 | 3/1964 | Murphy | 137—68 |
| 3,202,162 | 8/1965 | Eckardt et al. | 137—68 |
| 3,260,272 | 7/1966 | Eckardt | 137—68 |

FOREIGN PATENTS

| | | |
|---|---|---|
| 1,000,907 | 2/1952 | France. |

WILLIAM F. O'DEA, *Primary Examiner.*

R. GERARD, *Assistant Examiner.*